REFERENCE SIGNAL PHASE SHIFT TRANSITION DETECTOR

Filed Oct. 17, 1966 2 Sheets-Sheet 1

INVENTORS
GEORGE C. WILKINSON JR.
HUGH L. SELMAN
BY
Moody and Kintzinger
ATTORNEYS INVENTORS
GEORGE C. WILKINSON JR.
HUGH L. SELMAN
BY
Moody and Kintzinger
ATTORNEYS United States Patent Office 3,464,019
Patented Aug. 26, 1969

3,464,019
REFERENCE SIGNAL PHASE SHIFT TRANSITION DETECTOR

George C. Wilkinson, Jr., Dallas, Tex., and Hugh L. Selman, Tulsa, Okla., assignors to Collins Radio Company, Cedar Rapids, Iowa, a corporation of Iowa Filed Oct. 17, 1966, Ser. No. 587,266
Int. Cl. H03d 3/18
U.S. Cl. 329—122 9 Claims

ABSTRACT OF THE DISCLOSURE

A phase shift intelligence modulated reference signal detector circuit with parallel first and second signal paths through a portion thereof. This is with the reference frequency signal in the first path subject to immediate phase shift with such modulated phase shift in the signal input, and with a time lagged phase shift adjusting oscillator included in the second path and the oscillator output activating a phase detection circuit having a signal periodic ground path modulating connection to the first signal path in advance of a reference signal filter in the first signal path.

Figure 1:
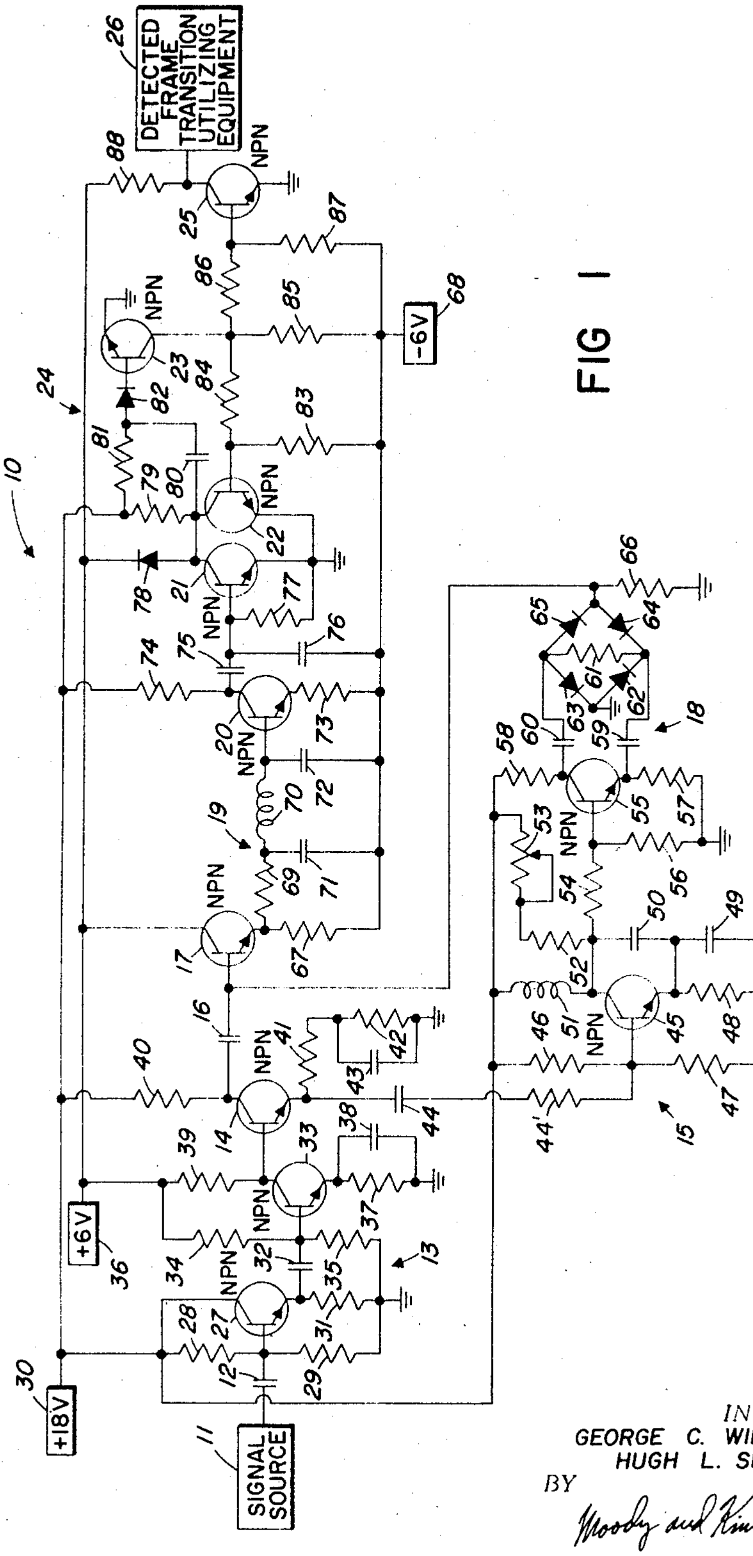

This invention relates in general to signal phase reversal detecting circuits, and in particular, to a phase-frame transition detector that may be readily adjusted (or modified) to detect substantially any type of signal phase change.

This circuit is particularly useful for detecting signal phase reversal in demodulating signals, for example, of the Kineplex type. With at least two other signal basic phase change (or transition) detectors, there are inherent weaknesses (or difficulties) making them either difficult to manufacture, costly, difficult to maintain and/or performance is marginal. One of these pre-existing phase change detectors used a mechanical filter, set at the frame transition frequency. With this detector when the frame reference presented a new phase, the filter is momentarily quenched and then redriven at the same frequency. This action produces a football type envelope that is rectified and then applied to a Schmitt trigger circuit for providing an output pulse with every phase-frame transition. The other prior phase change or transition detector uses a notched filter effectively attenuating the frame transition frequency. When the frequency signal subject to phase shift has a phase change, the original frequency momentarily breaks up into harmonic splatter. With the filter notch present, the fundamental frequency is not fed to an amplifier with, however, splatter being passed to the amplifier, and this phase-frame change detector uses a one-shot circuit triggered from the output of the amplifier. It is a phase change detector quite costly to manufacture with mechanical filters involved, and difficult to maintain and it generally provides marginal performance at best.

It is, therefore, a principal object of this invention to provide a phase-frame transition detector capable of demodulating phase reversal type signals readily adaptable for detection of substantially any type signal phase change.

A further object is to provide such a phase-frame transition detector that is relatively a simple circuit providing highly reliable operation results.

Still another object is to eliminate any requirements for mechanical filters in such detectors and to omit any harmonic splatter feed through the detector to an amplifier.

Features of this invention useful in accomplishing the above objects include, in a phase-frame transition detector circuit, a signal source supplying a predetermined reference frequency subject to modulated signal phase shifts.

This may be a radio receiver with an RF audio detecting system providing the predetermined reference frequency, a signal input line from a phone-data transmission system, and with each possibly including a filter of the notched type for filter action removal by attenuation of, for example, a Doppler frequency with signals of the Kineplex type employed with Kineplex systems. Use of such a low tolerance notch filter would attenuate the effects of such a Doppler frequency to protect amplifier transistors from being overdriven in which state of operation there could be a degradation of phase change information modulated on the input reference frequency and being demodulated therefrom by the detector circuit. The reference input frequency subject to information modulated phase shifting is fed through a signal amplifying and squaring section to an emitter follower amplifier with two outputs. One of the outputs is to, generally, a free running oscillator circuit, and the other output is through a signal coupling capacitor to another amplifier. A particularly important feature is that the, generally, free running oscillator receives repeated successive input energy pulses pumped thereinto from the emitter follower, with two outputs, to bring the free running oscillator to sink at the phase of the input signal but, with the energy level of this pumped-in energy being sufficiently low so that immediately subsequent to a phase shift the oscillator continues to free run for a period of time at the previously established phase relation. This so controls a balanced diode ring modulator circuit that chop ground references the other output passed from the emitter follower amplifier, having two outputs, as to immediately give a positive phase change indication to the succeeding amplifier. The output of hte succeeding amplifier is then passed through a harmonic filter to a voltage amplifier with the harmonic filter removing harmonic spurious frequency signals and the reference frequency input. The phase shift transition detector also features a one-shot action trigger circuit that provides a one-shot pulse output from the circuit of a more surely detectable nature with sufficient duration to insure a properly readable output for the receiving detected phase shift or frame transition utilizing equipment.

A specific embodiment representing what is presently regarded as the best mode of carrying out the invention is illustrated in the accompanying drawings.

Figure 2:
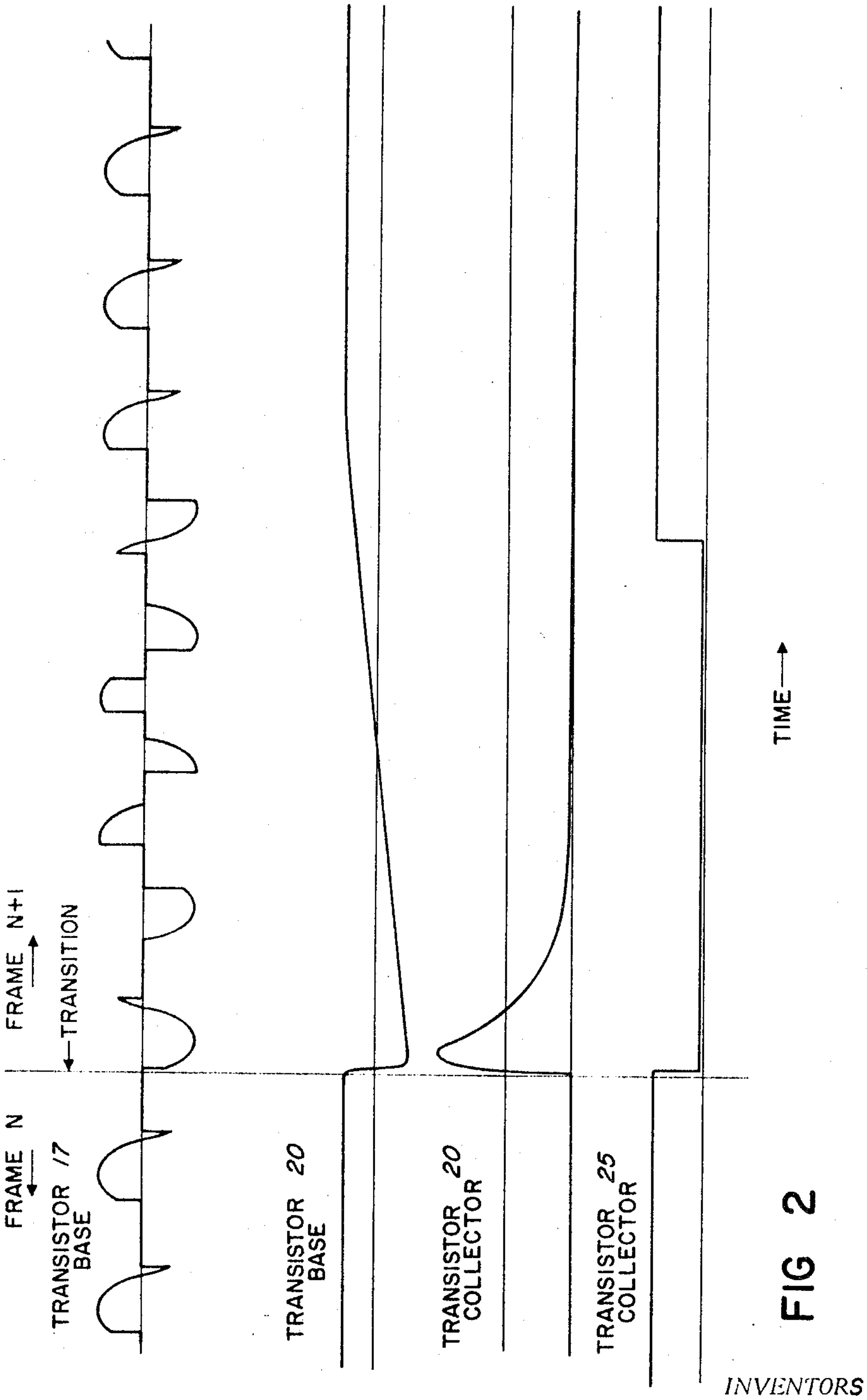

In the drawings:

FIGURE 1 represents a schematic of applicants' improved phase shift (or frame transition) detector; and, FIGURE 2, signal waveform timing diagram curves illustrating action at various locations in the circuit through a phase shift (actually 180° frame transition) from one phase reference frequency signal phase to a shifted phase.

Referring to the drawings:

The phase-frame transition detector 10 of FIGURE 1 receives an input signal of a predetermined frequency from signal source 11 through a signal coupling capacitor 12 to a signal amplifying and squaring section 13. The signal is passed from the amplifying and squaring section 13 to an emitter follower amplifier 14 having two outputs, an emitter follower output connection to, generally, free running oscillator circuit 15 and a collector signal output path through coupling capacitor 16 to the base of another emitter follower amplifier 17. The output of the oscillator circuit 15 is connected to an amplifier-balanced diode ring modulator circuit 18 that effectively periodically grounds the signal at the base of emitter follower amplifier 17. The emitter follower output of amplifier 17 is applied through a harmonic filter 19 to the base of voltage amplifier 20. Signal pulse outputs of voltage amplifier 20 saturate amplifier 21, the resulting output of which initiates a one-shot action with the amplifier 22 and amplifier 23 one-shot trigger circuit 24. The one-shot pulse output of circuit 24 is buffered by amplifier 25 to provide an output to detecting frame transition utilizing equipment 26.

The signal input path of phase shift detector 10 is through the signal coupling capacitor 12 to the base of NPN transistor 27 of the signal amplifying and squaring section 13. The junction of capacitor 12 and the base of transistor 27 is connected to the common junction of voltage divider resistors 28 and 29 connected between positive voltage supply 30 and ground. The collector of the transistor 27 is also connected directly to the voltage supply 30 while its emitter follower output is connected through resistor 31 to ground, and also through signal coupling capacitor 32 to the base of NPN transistor 33 also of the signal amplifying and squaring section 13. The common junction of capacitor 32 and the base of transistor 33 is connected to the common junction of voltage divider resistors 34 and 35 connected between the positive voltage supply 36 and ground. The emitter of transistor 33 is connected through resistor 37 and capacitor 38 in parallel to ground, and its collector output is connected through resistor 39 to the positive voltage supply 36, and also directly, in the signal path, to the base of NPN transistor amplifier 14.

NPN transistor 14 is connected in the circuit as a transistor emitter follower amplifier having two outputs, with the collector output connection having a bias connection through resistor 40 to positive voltage supply 30, and with the signal path through signal coupling capacitor 16 to the base of NPN transistor 17, connected as an emitter follower amplifier in the circuit. The other output of transistor amplifier 14, the emitter follower output, includes an emitter connection through resistor 41 and serially on through resistor 42 and capacitor 43 in parallel to ground for developing the emitter follower signal effect at the emitter output of the transistor.

The emitter follower output signal path of transistor 14 is through signal coupling capacitor 44 and serially resistor 44′ to the base of NPN transistor 45 of the oscillator circuit 15. The common junction of signal coupling capacitor 44 and the base of transistor 45 is connected to the common junction of voltage dividing resistors 46 and 47 connected between positive voltage supply 30 and ground. The emitter of transistor 45 is connected through resistor 48 and capacitor 49 in parallel to ground, capacitor 50 is connected between the emitter and collector of transistor 45, and the collector is connected both through coil 51 to positive voltage supply 30, and also serially through resistors 52 and adjustable resistor 53 to the positive voltage supply 30. It should be noted at this point that the capacitors 49 and 50 and the coil 51 form a tank circuit in the, generally, free running oscillator circuit 15 with component values designed for a particular predetermined signal frequency and such that the oscillator circuit is subject to coming to synchronous with a new signal phase of the reference frequency after a short delay interval following a phase shift thereof at the transistor amplifier 14. This change, however, is not immediate since the new phase related input pulses pumped to the oscillator circuit 15 are of such a relatively low energy level as to result in a discreet interval of time before the energy put in is effectively such as to overcome the free running effect at the previously existing phase of the reference frequency in continued free running of the oscillator circuit 15 and bring the oscillator to synchronous with the new phase of the reference frequency.

The signal output path connection of NPN transistor 45, the capacitors 49 and 50 and coil 51 tank circuit, and of the oscillator circuit 15 is from the collector of NPN transistor 45 and the common junction of capacitor 50, coil 51, and resistor 52 through resistor 54 to the base of NPN transistor amplifier 55 of the amplifier-balanced diode ring modulator circuit 18. The common junction of resistor 54 and the base of transistor 55 is connected through resistor 56 to ground. The emitter is connected through resistor 57 to ground and the collector of transistor 55 is connected through resistor 58 to positive voltage supply 30. The emitter and collector of transistor 55 are connected through capacitors 59 and 60, respectively, to the two opposite corners of a diode bridge circuit interconnected by resistor 61. The diode bridge circuit includes four diodes 62, 63, 64 and 65 with a ground connection between diodes 62 and 63 and a signal output connection between diodes 64 and 65. It should be noted that the diodes 63 and 65 are so oriented in the bridge circuit, anodes toward the capacitor 60 connection, and the diodes 62 and 64 so oriented, cathodes toward the capacitor 59 connection, as to provide a balanced diode ring modulator circuit 18. The output connection of this balanced diode ring modulator from the common connection between diodes 64 and 65 is connected both through resistor 66 to ground and to the base of emitter follower amplifier transistor 17.

The collector of transistor 17 is connected to positive voltage supply 36 while the emitter thereof is connected through resistor 67 to negative voltage supply 68. The output signal path of the emitter follower transistor 17 is from the emitter serially through resistor 69 and coil 70 to the base of voltage amplifier NPN transistor 20. Coil 70 is part of a harmonic filter 19 also including capacitor 71, connected between the junction of resistor 69 and coil 70 and the minus voltage supply 68, and including capacitor 72 connected between the common junction of coil 70 and the base of transistor 20 and the minus voltage supply 68. This harmonic filter 19 is designed to filter out harmonics and the signal input frequency subjected to signal modulated phase shifts in order that a clean signal pulse may be applied to the base of the voltage amplifier transistor 20 with each reference frequency signal phase shift in the signal input to the phase shift detector 10.

The emitter of transistor 20 is connected through resistor 73 to the negative voltage supply 68 while the collector of the transistor is connected through resistor 74 to the positive voltage supply 30, and also in a signal path connection through capacitor 75 to the base of NPN transistor 21 which is subject to saturation with a pulse output from the collector of voltage amplifier 20. The base of transistor 21 is connected through capacitor 76 to the negative voltage supply 68 and also through resistor 77 to ground. The emitter of transistor 21 is directly connected to ground while the collector output terminal thereof is connected to the anode of diode 78, the cathode of which is connected to positive voltage supply 36. The output connection of transistor 21 is from the collector thereof to the collector of NPN transistor 22 of the one-shot trigger circuit 24. The emitter of transistor 22 is connected directly to ground, and the collector, in addition to the input connection, is connected through resistor 79 to positive voltage supply 30. A signal path from transistor 22 is from the collector through capacitor 80 to the junction of resistor 81, connected at its other end to the positive voltage supply 30, and the anode of diode 82, the cathode of which is connected to the base of the NPN transistor 23, also a part of one-shot trigger circuit 24. The base of NPN transistor 22 is connected through resistor 83 to negative voltage supply 68 and also through resistor 84 to the collector of the NPN transistor 23, the emitter of which is connected to ground. The common junction of resistor 84 and the collector of NPN transistor 23 is connected to negative voltage supply 68 through resistor 85 and also through resistor 86 to the base of output amplifier transistor 25. The base of transistor 25 is connected through resistor 87 to the negative voltage supply 68, while the emitter is connected directly to ground, and the collector is connected through resistor 88 to the positive voltage supply 36 and also as the final signal output to detected signal phase shift or frame transition utilizing equipment 26.

The input reference frequency is amplified and squared through the transistors 27 and 33 of signal amplifying and squaring circuit 13 and then applied as an input to the amplifier emitter follower transistor 14 having an emitter signal output and a collector signal output. The emitter output portion of the signal from transistor 14 is applied as an input to transistor 45 for bringing the otherwise, generally, free running oscillator circuit 15 to phase synchronization with the input reference signal as applied to the base of transistor 45. The collector output of transistor 14 as the additional output thereof is applied to the base of emitter follower transistor 17. Referring again, at this point, to the oscillator circuit 15, the output thereof is connected to the amplifier-balanced diode ring modulator circuit 18, having a circuit connection with the base of emitter follower transistor 17. The amplifier-balanced diode ring modulator circuit 18 as activated by the signal of oscillator 15 periodically grounds the signal at the base of transistor 17 through predetermined portions of each cycle of the oscillator 15 frequency to provide a modulating action by the signal of oscillator 15 at the transistor 17, and with this constituting the basic scheme of operation. Between phase transitions (in other words, substantially 180° phase shifts) in the input reference frequency, the oscillator becomes phase locked to the incoming signal. Thus, the diode ring circuit as controlled by the oscillator frequency presents a chopping frequency diode ring action having a definite phase relation to the signal appearing at the collector of transistor 14 and being passed as a signal to transistor 17.

When the signal from the collector of transistor 14 is chopped by the diode ring circuit grounding chopping action at the base of transistor 17, a constant value DC component of voltage is produced. When a phase transition occurs, the oscillator phase does not immediately follow the change to synchronism to, and with the phase of the new reference frequency phase because the electro-kinetic energy in the LC tank circuit of oscillator 15 is of such an energy level relative to the relatively small individual pulses of energy input passed from the emitter of transistor 14 as a continuing input to the oscillator circuit. Thus, for a short time until the electro-kinetic energy in the LC tank circuit decays to a predetermined transition level, the oscillator remains running in a free running state at an abnormal unstable phase relation with respect to the input reference frequency. When the transition stage is reached, after a short interval, the oscillator again regains its original phase relation to the input signal through increasing or decreasing its frequency momentarily, generally, according to whether it ran high or low in frequency. Because there is a momentary change in phase relation between the diode ring circuit output signal and the signal on the collector of transistor 14, a new and different value for the DC component of voltage on the base of transistor 17 appears. Thus, when a phase transition occurs, an instant step in the DC component of voltage at the base of transistor 17 occurs as is indicated by reference to the transistor 17 base waveform curve and the resulting signal waveform at the base of transistor 20, as shown in FIGURE 2. Since the original phase relation of the oscillator circuit 15 to the signal on the collector of transistor 14 is eventually, after some few successive signal cycles, regained, the DC component on the base of transistor 17 returns to its original value. Then, since the DC change occurred in a very short time and because the DC returned to its original value, a pulse of voltage occurs at the transition time. It is a pulse that may be positive or negative according to the original phase relation between the frequency of oscillator 15 and the signal as it appears on the collector of transistor 14. For example, if the DC voltage had a large negative value, it will momentarily change to a large positive value, and if it was a small positive value, it will change to a small negative value, and in like comparable manner with other related examples. It should be noted that with phase-frame transitions (actually substantially 180° phase signal reversals) that oscillator circuit 15 will momentarily increase its frequency to regain a strobe phase relation if it would normally run free at a higher frequency without synchronization. Conversely, it will decrease its frequency to correct if it would free run at a lower frequency than the strobe synchronization frequency.

In a working embodiment, the circuit has been arranged such that the normal DC voltage component at the base of transistor 17 is highly positive so that when a phase transition occurs a negative pulse is generated as substantiated by the signal waveform curves of FIGURE 2. The filter circuit 19 in the phase transition detector circuit filters out the fundamental reference frequency and harmonics to provide a clean negative going pulse waveform at the base of transistor 20, as shown in FIGURE 2, to result in a positive going pulse waveform at the collector of transistor 20, also shown in FIGURE 2, that saturates transistor 21. This initiates a one-shot action through the one-shot trigger circuit 24 of transistors 22 and 23 to provide a one-shot pulse buffered by the transistor 25 and provides an output signal pulse waveform as indicated for the collector of transistor 25 in FIGURE 2. Thus, we have a circuit that puts out a one-shot pulse for every frame transition with no critical valued or excessively expensive parts required. It is a detector circuit capable of detecting phase transitions or shifts of only a few degrees up to a complete phase transition of 180°.

Various components and values used in a phase-frame transition detector, capable of detecting phase transitions of from only a few degrees up to 180° phase reversal phase-frame transitions, in accordance with the schematic of FIGURE 1 and providing the operational waveform curves of FIGURE 2 include the following:

| | | |
|---|---|---|
| Signal source **11** reference frequency | c.p.s. | 2915 |
| Capacitor **12** | microfarads | 0.01 |
| NPN transistors **14, 17, 21, 27, 33** | | 2N930 |
| Capacitor **16** | microfarads | 10 |
| NPN transistors **20, 22, 23, 25, 45, 55** | | 2N718A |
| Resistors **28, 29** | ohms | 47K |
| Positive voltage supply **30** | volts | +18 |
| Resistors **31, 46, 47, 48** | ohms | 4.7K |
| Capacitors **32, 38, 43** | microfarads | 10 |
| Resistors **34, 37, 84** | ohms | 1.8K |
| Resistors **35, 86** | do | 2.7K |
| Positive voltage supply **36** | volts | +6 |
| Resistors **39, 42, 57, 58, 67, 73, 85** | ohm | 1K |
| Resistor **40** | do | 5.6K |
| Resistors **41, 69, 88** | do | 1.5K |
| Capacitors **44, 59, 60** | microfarads | 1.5 |
| Resistor **44'** | ohms | 27K |
| Capacitor **49** | microfarads | 0.33 |
| Capacitor **50** | do | 0.033 |
| Coil **51** | millihenries | 120 |
| Resistors **52, 54** | ohms | 10K |
| Resistor **53** | do | 50K |
| Resistor **61** | do | 2.2K |
| Diodes **62, 63, 64, 65, 78, 82** | | 1N914 |
| Resistor **66** | ohms | 18K |
| Minus voltage supply **68** | volts | −6 |
| Coil **70** | millihenries | 500 |
| Capacitors **71, 72, 75** | microfarads | 0.1 |
| Resistor **74** | ohms | 3.3K |
| Capacitor **76** | microfarads | 0.068 |
| Resistor **77** | ohms | 22K |
| Resistor **79** | do | 3.9K |
| Capacitor **80** | microfarads | 2.2 |
| Resistors **81, 83** | ohms | 15K |
| Resistor **87** | do | 33K |

Whereas this invention is here illustrated and described with respect to a specific embodiment thereof, it should be realized that various changes may be made without departing from the essential contribution to the art made by the teachings hereof.

We claim:

1. In a phase shift intelligence modulated reference signal detector circuit, a reference frequency phase shift modulated signal source; first signal path means connected to said signal source; said first signal path including filter means effectively attenuating the input reference frequency signal; second signal path means connected to said signal source and including an oscillator circuit; said oscillator circuit including tank means with components of coordinated values, consistent with the tank circuit design, giving a limited period of free running phase adjusting oscillation subject to phase adjustment to the reference frequency and from initially the signal phase as determined by the previously existing phase of the reference signal as applied through said second signal path to the oscillator circuit whenever a phase shift transition occurs in the signal input from said signal source; phase detection signal modulating means connected to the output of said oscillator circuit and having a modulating connection to said first signal path in advance of said filter means for developing substantially an immediate shift in the DC component of the resultant signal on said first signal path with a phase shift in the input signal to the detector circuit and for the DC component of the resultant signal on said first signal path to be returned to the original DC value level determined by steady state conditions normally existing in the resultant signal on said first signal path when, after a short interval of time, the oscillator completes a momentary frequency shift to bring its phase relation at the conclusion of each free running phase adjusting oscillating period to the original DC component level of the resultant signal in said first signal path when the oscillator is operating in the phase synchronized mode of operation with respect to the reference frequency as applied to the oscillator circuit.

2. The phase shift modulated reference signal detector of claim 1, wherein said phase detection signal modulating means is a diode ring modulator circuit having a connection to a voltage potential reference source; diode ring modulator circuit signal input activating means interconnecting the output of said oscillator circuit and said diode ring modulator circuit; and with said modulating connection to said first signal path being an additional connection of said diode ring modulator circuit for periodically voltage potential reference source modulating said first signal path through a portion of each signal cycle of said oscillator circuit.

3. The phase shift modulated reference signal detector of claim 2, wherein said diode ring modulator circuit is a balanced diode ring modulator circuit; and with said diode ring modulator circuit signal input activating means being a two output amplifier having an input connection with the output of said oscillator circuit, and with the two outputs of the two output amplifier having connections respectively with two terminals of said balanced diode ring modulator circuit.

4. The phase shift modulated reference signal detector of claim 2, wherein a two output amplifier is connected to said signal source, and with one output of said two output amplifier connected to said first signal path means and the second output of said two output amplifier connected to said second signal path means.

5. The phase shift modulated reference signal detector of claim 4, including signal amplifying and shaping means interconnecting said signal source and said amplifier equipped with two signal outputs.

6. The phase shift modulated reference signal detector of claim 4, wherein said filter means in said first signal path has filter component values providing a filter effectively attenuating the reference frequency input signal frequency and spurious harmonic signals.

7. The phase shift modulated reference signal detector of claim 4, wherein said first signal path includes circuitry to an output connection that may be connected to detected phase shift signal utilizing equipment, and with said first signal path including, after said connection with said diode ring modulating circuit: said filter means in the form of a reference input signal frequency and harmonic frequency signal filter; amplifying means; a one-shot action one-shot trigger circuit; and signal buffering means.

8. The phase shift modulated reference signal detector of claim 4, wherein said second signal path means includes impedance means.

9. The phase shift modulated reference signal detector of claim 8, wherein said two output amplifier is a transistor having a collector output and an emitter output connected to said first and second signal path means, respectively; and with said impedance means in said second signal path including capacitive means and resistive means.

References Cited

UNITED STATES PATENTS

| | | | |
|---|---|---|---|
| 3,119,964 | 1/1964 | Crafts | 325—320 |
| 3,339,143 | 8/1967 | Chaffee | 325—30 X |

ALFRED L. BRODY, Primary Examiner

U.S. Cl. X.R.

178—66; 307—233; 325—320, 30; 329—136, 145